US011385990B2

(12) United States Patent
Huang et al.

(10) Patent No.: US 11,385,990 B2
(45) Date of Patent: *Jul. 12, 2022

(54) DEBUGGING APPLICATIONS FOR DELIVERY VIA AN APPLICATION DELIVERY SERVER

(71) Applicant: GOOGLE LLC, Mountain View, CA (US)

(72) Inventors: Yan Huang, Mountain View, CA (US); Nikhil Rao, Santa Clara, CA (US); Owen Lin, Mountain View, CA (US); Ilya Firman, Sunnyvale, CA (US); Anil Iyer, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/333,535

(22) PCT Filed: Mar. 13, 2019

(86) PCT No.: PCT/US2019/022051
§ 371 (c)(1),
(2) Date: Mar. 14, 2019

(87) PCT Pub. No.: WO2020/185224
PCT Pub. Date: Sep. 17, 2020

(65) Prior Publication Data
US 2021/0240598 A1    Aug. 5, 2021

(51) Int. Cl.
*G06F 11/36* (2006.01)
*G06F 8/60* (2018.01)

(52) U.S. Cl.
CPC ............ *G06F 11/3664* (2013.01); *G06F 8/60* (2013.01); *G06F 11/3604* (2013.01)

(58) Field of Classification Search
None
See application file for complete search history.

(56) References Cited

U.S. PATENT DOCUMENTS 8,135,775 B1 * 3/2012 Anderson ................. G06F 8/61
 709/203
10,423,403 B1 * 9/2019 Natarajan ................. G06F 8/65
(Continued)

FOREIGN PATENT DOCUMENTS

WO    WO-2014/137321 A1    9/2014

OTHER PUBLICATIONS

European Patent Office; Communication Pursuant to Article 94(3)EPC issued in Application No. 19714914.9; 6 pages; dated Feb. 22, 2021.
(Continued)

*Primary Examiner* — Lewis A Bullock, Jr.
*Assistant Examiner* — Mark A Gooray
(74) *Attorney, Agent, or Firm* — Middleton Reutlinger

(57) ABSTRACT

Analyzing or debugging applications is provided. The system identifies an action for an application provided by a developer. The system determines a first classification score based on historical execution of the action. The system generates a machine generated action for the application based on metadata associated with the application. The system determines a second classification score based on a comparison of the action with the machine generated action. The system selects, via a matching program, a second application that matches the application. The system determines a third classification score based on a comparison of an action approved for the second application with the action provided by the application developer. The system updates a delivery control parameter based on the first classification score, the second classification score and the third classifi-
(Continued)

cation score. The system controls delivery of the application based on the delivery control parameter.

19 Claims, 4 Drawing Sheets

(56) References Cited

U.S. PATENT DOCUMENTS

| | | |
|---|---|---|
| 2015/0106942 A1 | 4/2015 | Borghetti et al. |
| 2015/0199515 A1* | 7/2015 | Qureshi .................. G06F 21/56 726/22 |
| 2016/0210458 A1 | 7/2016 | Bettini et al. |
| 2019/0228261 A1* | 7/2019 | Chan ......................... G06F 8/60 |
| 2019/0391798 A1* | 12/2019 | Farrell ...................... G06F 8/60 |

OTHER PUBLICATIONS

International Search Report and Written Opinion of the International Searching Authority for PCT Appln. Ser. No. PCT/US2019/022051 dated Nov. 27, 2019 (17 pages).

Intellectual Property India; Examination Report issued in Application No. IN202127035626; 6 pages; dated Mar. 11, 2022.

\* cited by examiner though the application delivery server.

DEBUGGING APPLICATIONS FOR DELIVERY VIA AN APPLICATION DELIVERY SERVER

CROSS-REFERENCES TO RELATED APPLICATIONS

This application is a U.S. National Stage under 35 U.S.C. § 371 of International Patent Application No. PCT/US19/22051, filed on Mar. 13, 2019 and designating the United States, which is hereby incorporated by reference herein in its entirety.

BACKGROUND

Applications can be installed on a computing device. The computing device can execute the application.

SUMMARY

The present disclosure is generally directed to analyzing or debugging applications for delivery via an application delivery server. Responsive to a request or trigger, applications may perform malicious actions or perform incorrect actions. Performance of malicious or incorrect actions can result in wasted computing resource utilization, bandwidth utilization, and battery utilization on a mobile device. Further, performance of malicious or incorrect actions can cause an increase in remote procedure calls due to repeated requests before the correct action is performed. Cyber security issues may result from the provision of applications that perform malicious actions, and timely identification and addressing of such applications may provide system security benefits. Due to the large number of applications and updates to applications that are provided for delivery via an application delivery server, it can be challenging to efficiently and reliably detect applications that perform malicious or incorrect actions, e.g. to detect fraudulent applications or to perform a quality or other review on applications without causing delay in the review process. Systems and methods of the present technical solution allow for an application to be reviewed based on historical execution information, simulated actions, or a matched application. Based on the review, the present technical solution can prevent delivery of the application or disable a particular action of the application that is determined to be fraudulent or incorrect.

At least one aspect is directed to a system to analyze or debug applications for delivery via an application delivery server. The system can include a data processing system having one or more processors and memory. The data processing system can identify, for an application, a messaging object configured with an action by the application developer. The application can be submitted by an application developer. The data processing system can determine a first classification score based on historical execution of the action of the messaging object provided by the application developer. The data processing system can generate a machine generated action for the application based on metadata associated with the application. The data processing system can determine a second classification score based on a comparison of the action of the messaging object provided by the application developer with the machine generated action. The data processing system can select, via a matching program, a second application that matches the application. The data processing system can determine a third classification score based on a comparison of an action approved for the second application with the action of the messaging object provided by the application developer. The data processing system can update a delivery control parameter based on one, or more or each of: the first classification score, the second classification score and/or the third classification score. The data processing system can control, responsive to the delivery control parameter updated by the data processing system, delivery of the application by the application delivery server.

Exemplary optional features of the system may be as follows. The data processing system may be configured to receive the application from an application developer device. The data processing system may be configured to receive a data file associated with the application comprising a plurality of actions established by the application developer for the application. The data processing system may be configured to receive an indication that the application is a new application uploaded by the application developer for delivery by the application delivery server. The data processing system may be configured to trigger, responsive to the indication of the new application, a debugging process comprising determination of the first classification score, the second classification score and the third classification score. The data processing system may be configured to receive an indication that the application is an updated version of the application uploaded by the application developer for delivery by the application delivery server. The data processing system may be configured to trigger, responsive to the indication of the updated version of the application, a debugging process comprising determination of the first classification score, the second classification score and the third classification score. The data processing system may be configured to receive an indication of negative feedback for the application from a client computing device on which the application is installed. The data processing system may be configured to trigger, responsive to the indication of the negative feedback for the application, a debugging process comprising determination of the first classification score, the second classification score and the third classification score. The data processing system may be configured to determine to trigger a debugging process comprising determination of the first classification score, the second classification score and/or the third classification score prior to delivery of the application for installation on a client computing device. The first classification score may indicate whether an action corresponding to the application is satisfied based on a comparison of the first classification score with a threshold. The data processing system may be configured to determine that the application matches the second application based on a similarity score between the application and the second application greater than a similarity threshold. The data processing system may be configured to determine to authorize delivery of the application based on the first classification score, the second classification score and the third classification score. The data processing system may be configured to update the delivery control parameter to cause delivery of the application by the application delivery server. The data processing system may be configured to determine a classification failure based on at least one of the first classification score, the second classification score or the third classification score being less than a failure threshold. The data processing system may be configured to determine a classification failure based on the first classification score, the second classification score and the third classification score. The data processing system may be configured to update, responsive to the classification failure, the delivery control parameter to block delivery of the application by the application delivery server. The data processing system may be configured to transmit a notification to the application developer of the classification failure. The data processing system may be configured to request, responsive to the classification failure, an updated version of the application from the application developer. The data processing system may be configured to determine, for the action of the messaging object, a classification failure based on the first classification score, the second classification score and/or the third classification score. The data processing system may be configured to disable, responsive to the classification failure, the action of the messaging object for execution via the application. The data processing system may be configured to authorize the application for delivery by the application delivery server. The data processing system may be configured to identify a plurality of actions established for the application. The data processing system may be configured to determine, via a debugging process for each of the plurality of actions, a first classification score, a second classification score and/or a third classification score. The data processing system may be configured to update the delivery control parameter to disable one or more of the plurality of actions based on the debugging process. The data processing system may be configured to identify a plurality of digital surfaces for execution of the action of the messaging object of the application. The data processing system may be configured to update the delivery control parameter to disable execution of the action of the messaging object of the application on a digital surface of the plurality of digital surfaces. The data processing system may be configured to trigger a debugging process for a third application. The data processing system may be configured to determine, via the debugging process for the third application, a first classification score for the third application. The data processing system may be configured to detect a first classification failure based on a comparison of the first classification score for the third application with a first classification threshold. The data processing system may be configured to exit, responsive to detection of the first classification failure, the debugging process for the third application prior to determining a second classification score for the third application and/or a third classification score for the third application. The data processing system may be configured to transmit a notification of the first classification failure to an administrator device.

At least one aspect is directed to a method of analyzing or debugging applications for delivery via an application delivery server. The method can be performed by a data processing system having a processor and memory. The method can include the data processing system identifying, for an application, a messaging object configured with an action by the application developer. The application can be submitted by an application developer. The method can include the data processing system determining a first classification score based on historical execution of the action of the messaging object provided by the application developer. The method can include the data processing system generating a machine generated action for the application based on metadata associated with the application. The method can include data processing system determining a second classification score based on a comparison of the action of the messaging object provided by the application developer with the machine generated action. The method can include the data processing system selecting, via a matching program, a second application that matches the application. The method can include the data processing system determining a third classification score based on a comparison of an action approved for the second application with the action of the messaging object provided by the application developer. The method can include the data processing system updating a delivery control parameter based on the first classification score, the second classification score and the third classification score. The method can include the data processing system controlling, responsive to the delivery control parameter updated by the data processing system, delivery of the application by the application delivery server.

The method may comprise receiving, by the data processing system, the application from an application developer device. The method may comprise receiving, by the data processing system, a data file associated with the application comprising a plurality of actions established by the application developer for the application. The method may comprise determining to authorize delivery of the application based on the first classification score, the second classification score and/or the third classification score. The method may comprise updating the delivery control parameter to cause delivery of the application by the application delivery server. The method may comprise determining a classification failure based on at least one of the first classification score, the second classification score or the third classification score being less than a failure threshold. The method may comprise updating, responsive to the classification failure, the delivery control parameter to block delivery of the application by the application delivery server.

At least one aspect is directed to a computer program product that, when implemented on a data processing system of an application delivery server, is configured to cause the data processing system to perform the method of analyzing or debugging applications for delivery via the application delivery server.

The individual features and/or combinations of features defined above in accordance with any aspect of the present invention or below in relation to any specific embodiment of the invention may be utilized, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
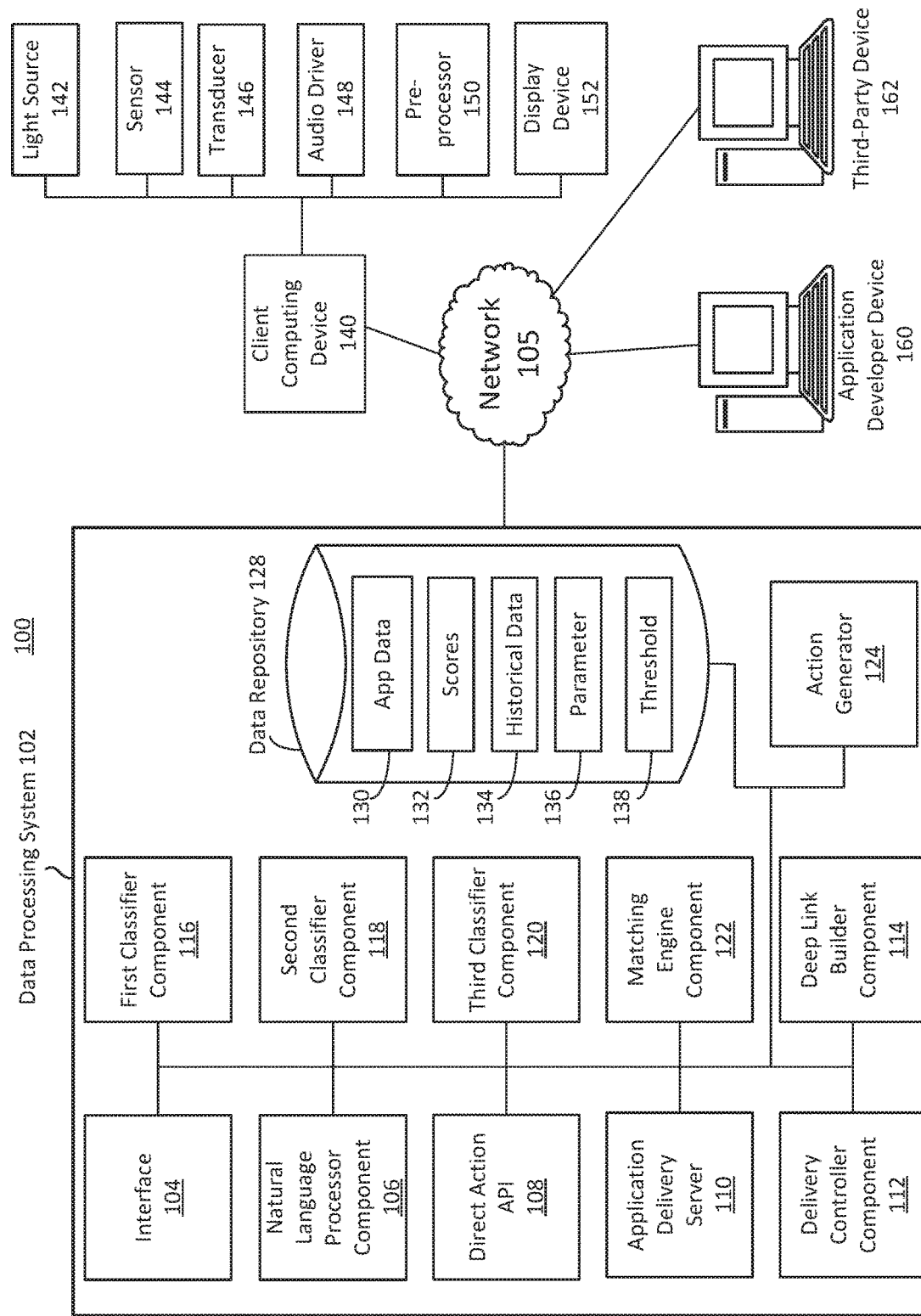
FIG. 1 is an illustration of an example system to debug applications.

Following below are more detailed descriptions of various concepts related to, and implementations of, methods, apparatuses, and systems of analyzing or debugging applications. The various concepts introduced above and discussed in greater detail below may be implemented in any of numerous ways.

The present disclosure is generally directed to analyzing or debugging applications for delivery via an application delivery server. For example, systems and methods of the present technical solution can analyze or debug actions configured in an application. An action can refer to or include a mechanism used by an application developer to surface their application and their content. An application developer can specify the actions their application supports. The application developer can submit their application, as well as an indication of the actions the application supports, to a data processing system. The data processing system, upon receiving the application and the indication of the actions provided by the application developer, can debug or review the application. The data processing system can debug or review the application before or after making the application available for download or use by end user client devices. The data processing system can debug or review the application to determine whether a deep link for the application causes the application to perform a function or provide a content item that is responsive to the requested action. For example, the data processing system can debug the application to determine whether the deep link for the application actually directs a user to a proper screen or state in the application based on the desired action. A deep link can refer to a hyperlink or other reference or pointer that links to a specific piece of content, such as a specific state or screen in an application, as opposed to a home page or initial state or screen of the application. Deep linking can refer to a link that points to a page or content that is beyond the highest-level home page or screen or state.

The data processing system can perform an analysis or debugging process for the application. The analysis or debugging process can include fraud detection and quality review. Fraud detection can refer to detecting whether the application is deliberately trying to mislead a user. For example, the user may request to book a ride to a specific destination, but the deep link into the application may take the user to a page that does not wish to fulfill the intent of the user. Instead, the deep link into the application may direct the user to malicious or abusive content.

Quality review can refer to determining if the deep links directs the user to the desired action and helps fulfill the intent of the user. To perform quality review, the data processing system can determine whether the intent allegedly being provided by the application is actually provided by the application. For example, a developer of a music streaming service can provide an application with entities for an artist and song. The user may request a song by the artist, which might cause the application to provide a deep link to be provided that directs the user directly to the page of the artist within the application. However, if the deep link ends up directing the user to a page of a different artist or a different type of page (e.g., audio books), then the deep link may be erroneous or bad.

Thus, responsive to a request or trigger, applications may perform malicious actions or perform incorrect actions. Performance of malicious or incorrect actions can result in wasted computing resource utilization, bandwidth utilization, and battery utilization on a computing device. Further, performance of malicious or incorrect actions can cause an increase in remote procedure calls due to repeated requests before the correct action is performed. Cyber security issues may result from the provision of applications that perform malicious actions, and timely automatic identification and addressing of such applications may provide system security benefits. Due to the large number of applications and updates to applications that are provided for delivery via an application delivery server, it can be challenging to efficiently and reliably detect malicious or fraudulent applications or perform a quality review on applications without causing delay in the review process. Systems and methods of the present technical solution allow for an application to be reviewed based on historical execution information, simulated actions, or a matched application. Based on the review, the present technical solution can prevent delivery of the application or disable a particular action of the application that is determined to be malicious, fraudulent or incorrect.

For example, a data processing system can include an application review system. The data processing system can receive, from an application developer, application metadata. Application metadata can include, for example, a title of the application, description of the application, screenshots of the application, an inventory of entities supported by the application, a web site or web corpus indicated entities supported by the application, an intent or action that corresponds to the entities supported by the application, and a mechanism or instruction as to how to construct a deep link for the entities of the application. For example, an application for a music streaming surface can provide a name, description, list of artists, songs as entities, and play music as the intent or action to be performed with the entities. The data processing system can apply a filter to identify a list of the entities and then sort the entities to identify the top entities. The data processing system can construct an application deep link that can trigger the application using a deep link building engine. The data processing system can perform a review including crawling the application or website to compare entities that show up via the deep link as compared to entities indicated by the application metadata if the results of the review indicate that the quality of the deep link for the application action is below a threshold. The data processing system can then block results of the review that indicate that the quality of the deep link for the application is below a threshold. The data processing system can block submission of the application or the action if the quality is below a threshold.

The data processing system can use or include one or more classifiers to review the application. The data processing system can include or be configured with a first classifier that can use feedback from users. For example, "Can Application_A book a ride for you?". The data processing system can collect feedback from the user and if a certain percentage of the users answer "yes" within a predetermined time frame, then the data processing system can determine that the application can perform the desired intent or action.

The data processing system can include or be configured with a second classifier. The second classifier can create a vector based on expanding entities and intents or actions associated with the application to then determine the most relevant intents associated with the application. For example, the data processing can parse or process the name of an application, a short description of the application, a long description of the application, and other sources such as user reviews to extract nouns and verbs. The data processing system can map the nouns and verbs (e.g., artist name, play music) and map them to actual intents or actions, such as play a song. The data processing system can then use a classification technique to determine a level of similarity between the automatically generated or detected intents or actions with the actions registered or provided by the application developer. If the actions are below a threshold level of similarity, then the data processing system can block the application.

The data processing system can include or be configured with a third classifier. The third classifier can determine a classification score for the application based on a similar application. For example, the first application can be a ride sharing application. The data processing system can identify a second application that is also a ride sharing application and has already passed the review process. If the first application is undergoing a debugging or review process, the data processing system can leverage the results of the second application that is similar to determine if the actions being submitted with the first application are satisfactory. The data processing system can perform this review process responsive to submission of the first application, or on an on-going basis.

The data processing, by using or being configured with one or more classifiers, can improve the quality and reliability of the analysis or debugging process, while also shortening the review process. The data processing system, via the one or more classifiers, can improve the efficiency of the application review process while also improving the results of the application review process. For example, data processing system, via the one or more classifiers, can review or debug applications without having to download each application, install the application, set up an account for the application, and then test the application.

Thus, by shortening the review process while also improving the results of the review process, the data processing system can provide an improvement to an application delivery server. The data processing system can further provide a reduction in resource consumption or resource utilization by, for example, reducing the number of remote procedure calls or fraudulent remote procedure calls or processing as a result of blocking or preventing delivery of fraudulent or malicious application. For example, a fraudulent or malicious application can provide misleading, fraudulent, or erroneous content items responsive to user queries or requests. The data processing system can further provide enhanced device security against malicious applications.

FIG. 1 illustrates an example system 100 to synchronize access controls between computing devices. The system 100 can include content selection infrastructure. The system 100 can include application delivery infrastructure. The system 100 can include an online application store or marketplace. The system 100 can include a data processing system 102. The data processing system 102 can communicate with one or more of an application developer device 160 or a client computing device 140 via network 105. The system 100 can also communicate with other devices, such as third-party devices, content provider devices, or digital surface devices.

The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one client computing device 140, such as a laptop, desktop, tablet, digital assistant device, smart phone, wearable device, portable computers, or speaker. For example, via the network 105 a user of the client computing device 140 can access information or data provided by the data processing system 102 or application developer device 160.

The network 105 can include or constitute a display network, e.g., a subset of information resources available on the internet that are associated with a content placement or search engine results system, or that are eligible to include third party digital components as part of a digital component placement campaign. The network 105 can be used by the data processing system 102 to access information resources such as web pages, web sites, domain names, or uniform resource locators that can be presented, output, rendered, or displayed by the client computing device 140. For example, via the network 105 a user of the client computing device 140 can access information or data provided by the data processing system 102 or the application developer device 160.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the client computing device 140 or the application developer device 160 or other networked device or third-party device. The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one third-party device 162. The third-party device 162 can include at least one logic device such as a computing device having a processor to communicate via the network 105, for example with the computing device 140, the data processing system 102, or the application developer device 160. The third-party device 162 can include at least one computation resource, server, processor or memory. For example, third-party device 162 can include a plurality of computation resources or servers located in at least one data center.

The third-party device 162 can provide audio based digital components for presentation or display by the client computing device 140 as an audio output digital component. The digital component can include an offer for a good or service, such as a voice based message that states: "Would you like me to order you a taxi?" For example, the third-party device 162 can include memory to store a series of audio digital components that can be provided in response to a voice based query. The third-party device 162 can also provide audio based digital components (or other digital components) to the data processing system 102 where they can be stored in the data repository 128. The data processing system 102 can select the audio digital components and provide (or instruct the third-party device 162 to provide) the audio digital components to the client computing device 140. The audio based digital components can be exclusively audio or can be combined with text, image, or video data.

The third-party device 162 can include, interface with, or otherwise communicate with the data processing system 102. The third-party device 162 can include, interface, or otherwise communicate with the client computing device 140. The third-party device 162 can include, interface, or otherwise communicate with the computing device 140, which can be a mobile computing device. The third-party device 162 can include, interface, or otherwise communicate with the application developer device 160. For example, the third-party device 162 can provide a digital component to the client computing device 140 for execution by the client computing device 140. The third-party device 162 can provide the digital component to the data processing system 102 for storage by the data processing system 102. The third-party device 162 can provide rules or parameters relating to the digital component to the data processing system 102.

The client computing device 140 can download an application developed by the application developer device 160. The client computing device 140 can download the application from the data processing system 102 via the network 105. The client computing device can download the application from the application delivery server 110. The client computing device 140 can install the application. The client computing device 140 can execute the application. The client computing device 140 can execute, launch, trigger or otherwise access or use the application responsive to a user input or trigger event or condition. The application can include a front-end component and a back-end component. The client computing device 140 can execute or provide the front-end component of the application, while the data processing system 102 or application developer device 160 provides a back-end component of the application.

The client computing device 140 can include, interface, or otherwise communicate with at least one sensor 144, transducer 146, audio driver 148, or pre-processor 150. The client computing device 140 can include a light source 142 or display device 152, such as a light indicator, light emitting diode ("LED"), organic light emitting diode ("OLED"), or other visual indicator configured to provide a visual or optic output. The sensor 144 can include, for example, an ambient light sensor, proximity sensor, temperature sensor, accelerometer, gyroscope, motion detector, GPS sensor, location sensor, microphone, or touch sensor. The transducer 146 can include a speaker or a microphone. The audio driver 148 can provide a software interface to the hardware transducer 146. The audio driver can execute the audio file or other instructions provided by the data processing system 102 to control the transducer 146 to generate a corresponding acoustic wave or sound wave. The pre-processor 150 can include a processing unit having hardware configured to detect a keyword and perform an action based on the keyword. The pre-processor 150 can filter out one or more terms or modify the terms prior to transmitting the terms to the data processing system 102 for further processing. The pre-processor 150 can convert the analog audio signals detected by the microphone into a digital audio signal, and transmit one or more data packets carrying the digital audio signal to the data processing system 102 via the network 105. In some cases, the pre-processor 150 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The client computing device 140 can be associated with an end user that enters voice queries as audio input into the client computing device 140 (via the sensor 144) and receives audio output in the form of a computer generated voice that can be provided from the data processing system 102 (or the application developer device 160 or the third-party device 162) to the client computing device 140, output from the transducer 146 (e.g., a speaker). The computer generated voice can include recordings from a real person or computer generated language.

The client computing device 140 (or computing device, or client device, or digital device) may or may not include a display. For example, the computing device may include limited types of user interfaces, such as a microphone and speaker. In some cases, the primary user interface of the computing device 140 may be a microphone and speaker, or voice interface. For example, the primary user interface of the client computing device 140 can include a voice-based or audio-based user interface. The client computing device 140 can include a display and have the primary user interface be voice-based or audio-based. The primary user interface of the client computing device 140 can be conversational. A conversational user interface can refer to a user interface that is at least in part driven or facilitated by a natural language processor component 106 of the data processing system 102.

The data processing system 102 can include a content placement system having at least one computation resource or server. The data processing system 102 can include, interface, or otherwise communicate with at least one interface 104. The data processing system 102 can include, interface, or otherwise communicate with at least one natural language processor component 106. The data processing system 102 can include, interface, or otherwise communicate with at least one direct action application programming interface ("API") 108. The interface 104, natural language processing component 106 and direct action API 108 can provide a conversational API or digital assistant functionality. The conversational API or digital assistant can communicate or interface with one or more voice-based interfaces or various digital assistant devices or surfaces in order to provide data or receive data or perform other functionality.

The data processing system 102 can include, interface, or otherwise communicate with at least one application delivery server 110. The data processing system 102 can include, interface, or otherwise communicate with at least one delivery controller component 112. The data processing system 102 can include, interface, or otherwise communicate with at least one deep link builder component 114. The data processing system 102 can include, interface, or otherwise communicate with at least one first classifier component 116. The data processing system 102 can include, interface, or otherwise communicate with at least one second classifier component 118. The data processing system 102 can include, interface, or otherwise communicate with at least one third classifier component 120. The data processing system 102 can include, interface, or otherwise communicate with at least one matching engine component 122. The data processing system 102 can include, interface, or otherwise communicate with at least one action generator 124. The data processing system 102 can include, interface, or otherwise communicate with at least one data repository 128.

The interface 104, natural language processor component 106, direct action API 108, application delivery server 110, delivery controller component 112, deep link builder component 114, first classifier component 116, second classifier component 118, third classifier component 120, matching engine component 122, and action generator 124 can each include at least one processing unit or other logic device such as programmable logic array engine, or module configured to communicate with the database repository 128 or database. The interface 104, natural language processor component 106, direct action API 108, application delivery server 110, delivery controller component 112, deep link builder component 114, first classifier component 116, second classifier component 118, third classifier component 120, matching engine component 122, action generator 124 and data repository 128 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of client computing devices 140 (or computing device or digital assistant device). A user of a client computing device 140 or mobile computing device can affirmatively authorize the data processing system 102 to obtain network activity information corresponding to the client computing device 140 or mobile computing device. For example, the data processing system 102 can prompt the user of the computing device 140 for consent to obtain one or more types of network activity information. The client computing device 140 can include a mobile computing device, such as a smartphone, tablet, smartwatch, or wearable device. The identity of the user of the client computing device 140 can remain anonymous and the computing device 140 can be associated with a unique identifier (e.g., a unique identifier for the user or the computing device provided by the data processing system or a user of the computing device). The data processing system can associate each observation with a corresponding unique identifier.

The data processing system 102 can interface with a third-party device 162. The third-party device 162 can include or refer to a device of a content provider. The content provider can establish an electronic content campaign. The electronic content campaign can be stored as content data in the data repository 128. An electronic content campaign can refer to one or more content groups that correspond to a common theme. A content campaign can include a hierarchical data structure that includes content groups, digital component data objects, and content selection criteria. To create a content campaign, the content provider can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or content provider), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 140. In some cases, an impression can refer to a viewable or audible impression; e.g., the digital component object is at least partially (e.g., 20%, 30%, 30%, 40%, 50%, 60%, 70%, or more) viewable on a display device 152 of the client computing device 140, or audible via a speaker 136 of the computing device 140. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The content provider can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The content provider can provide one or more keywords to be used by the data processing system 102 to select a digital component object provided by the content provider. The content provider can identify one or more keywords to bid on, and further provide bid amounts for various keywords. The content provider can provide additional content selection criteria to be used by the data processing system 102 to select digital component objects. Multiple content providers can bid on the same or different keywords, and the data processing system 102 can run a content selection process or ad auction responsive to receiving an indication of a keyword of an electronic message.

The content provider can provide one or more digital component objects for selection by the data processing system 102. The data processing system 102 can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. A digital component object (or digital component) can include, for example, a content item, an online document, audio, images, video, multimedia content, or sponsored content. Upon selecting a digital component, the data processing system 102 can transmit the digital component object for rendering on a computing device 140 or display device 152 of the computing device 140. Rendering can include displaying the digital component on a display device, or playing the digital component via a speaker of the computing device 140. The data processing system 102 can provide instructions to a computing device 140 to render the digital component object. The data processing system 102 can instruct the computing device 140, or an audio driver 148 of the computing device 140, to generate audio signals or acoustic waves.

The data repository 124 can include one or more local or distributed databases, and can include a database management system. The data repository 128 can include computer data storage or memory and can store one or more of application ("app") data 130, scores 132, historical data 134, parameters 136, or thresholds 138, among other data. The data repository 128 can store the one or more of application ("app") data 130, scores 132, historical data 134, parameters 136, or thresholds 138 in one or more data structures, databases, data files, indexes, or other type of data storage.

The app data 130 can include information about an application. The app data 130 can include information about an application submitted by an application developer device 160. The app data 130 can include metadata associated with an application. App data 130 can include, for example, a title of an application, short description, detail description, version identifier, entities, actions, intents, compatibility information, size, type of application, category of the application, among other information. App data 130 can include a unique identifier of the application, such as an alphanumeric identifier. App data 130 can include information about the application developer that provided or submitted the application.

Scores 132 can refer to a classification score of the application. Scores 132 can include a first classification score, second classification score, third classification score or combined classification score for an application. The data processing system 102 can review or process an application to determine the one or more scores, and store the scores for the application in the scores 132 data structure. Scores can be numerical, alphanumeric, letter grade, rank, symbol, text, binary, or otherwise provide an indication of a result of a review process of the application. For example, the score can include a numeric score in the range of 0 to 100, where 0 represents the lowest level or likelihood of fraud, and 100 represent the highest level or likelihood of fraud. The score can indicate whether the application passes the review process. For example, a score of 100 can indicate that the application passed the review process, whereas a score of 0 can indicate that the application failed the review process. The score can be a letter grade, such as "A", "B", "C", "D", or "F", where the letter grade of A can indicate that the application passed the review process, and a letter grade of F indicates that the application failed the review process. The score can be a keyword or text, such as "Pass" or "Fail". The score can be binary, such as "0" or "1".

Historical data 134 can include data related to an application. Historical data 134 can include data related to execution or use of an application. Historical data 134 can include data related to a previous use or execution of the application by a client computing device 140. Historical data 134 can include feedback related to a previous use or execution of the application. For example, a client computing device 140 can execute the application. The client computing device 140 can include a monitor or agent executing on the client computing device 140 that can identify aspects related to the application, such as the number of remote procedure calls, repeated requests made to the application, indications of erroneous responses or content data provided by the application, or indications of fraudulent or misleading content data or responses provided by the application. The client computing device 140 can provide feedback from a user regarding the execution of the application. For example, the client computing device 140 can provide a prompt to a user of the application as to whether the application provided a satisfactory response or performed the requested or desired action. For example, the prompt can include "Did Application_A satisfactorily perform the requested action?" The historical data 134 can include or store such feedback from the monitor or agent executing on the client computing device 140, as well as feedback to prompts or surveys provided by a user of the client computing device 140 or application.

The data repository 128 can store a parameter 136. Parameter 136 can refer to or include a parameter data structure. Parameter 136 can refer to or include a delivery control parameter. A delivery control parameter is a parameter that can cause the application delivery server 110 to deliver an application, block delivery of an application, authorize an action of an application, or disable an action of an application. Each application that has been reviewed or processed by the data processing system 102 can be associated with a delivery control parameter. The delivery control parameter can be an instruction, numeric parameter, alphanumeric value, flag, tag, or other indicator that can cause the application delivery server 110 to adjust whether or how an application is delivered to a client computing device 140.

The data repository 128 can include or store a threshold 138. The threshold 138 can refer to or include a threshold data structure. The data processing system 102 can compare a score 132 (e.g., a classification score) of an application with the threshold 138 in order to determine whether the application passes or fails a classification. The thresholds 138 can be the same or different for each type of classification. Thresholds 138 can be absolute thresholds (e.g., an absolute or fixed value), a percentage threshold, a ratio threshold. The threshold 138 can be a dynamic threshold that can vary based on metadata associated with an application. The threshold 138 can vary based on feedback, real-time information, or other factors. The threshold 138 can vary based on the type of application or version of the application (e.g., new application being submitted, or a new version of the application). The threshold 138 can be set for a specific application and vary based on, for example, the number of times the application has been installed (e.g., lower threshold for an application with more than 100,000 downloads because a high download count may indicate that the application is less likely to be fraudulent or provide erroneous content). In some cases, the threshold may be higher for an application with a high download count so the data processing system 102 can prevent a large number of erroneous responses or wasted remote procedure calls or other computing resource utilization.

The data processing system 102 can include an interface 104 (or interface component) designed, configured, constructed, or operational to receive and transmit information using, for example, data packets. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can communicate with one or more of the client computing device 140, application developer device 160, or third-party device 162 via network 105.

The data processing system 102 can interface with an application, script or program installed at the client computing device 140, such as an app to communicate input audio signals to the interface 104 of the data processing system 102 and to drive components of the local client computing device to render output audio signals. The data processing system 102 can receive data packets or other signal that includes or identifies an audio input signal.

The data processing system 102 can include a natural language processor ("NLP") component 106. For example, the data processing system 102 can execute or run the NLP component 106 to receive or obtain the audio signal and parse the audio signal. For example, the NLP component 106 can provide for interactions between a human and a computer. The NLP component 106 can be configured with techniques for understanding natural language and allowing the data processing system 102 to derive meaning from human or natural language input. The NLP component 106 can include or be configured with technique based on machine learning, such as statistical machine learning. The NLP component 106 can utilize decision trees, statistical models, or probabilistic models to parse the input audio signal. The NLP component 106 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 106 can convert the audio input signal into recognized text by comparing the input signal against a stored, representative set of audio waveforms (e.g., in the data repository 128) and choosing the closest matches. The set of audio waveforms can be stored in data repository 128 or other database accessible to the data processing system 102. The representative waveforms are generated across a large set of users, and then may be augmented with speech samples from the user. After the audio signal is converted into recognized text, the NLP component 106 matches the text to words that are associated, for example via training across users or through manual specification, with actions that the data processing system 102 can serve. Aspects or functionality of the NLP component 106 can be performed by the data processing system 102 or the client computing device 140. For example, a local NLP component can execute on the client computing device 140 to perform aspects of converting the input audio signal to text and transmitting the text via data packets to the data processing system 102 for further natural language processing.

The audio input signal can be detected by the sensor 144 or transducer 146 (e.g., a microphone) of the client computing device 140. Via the transducer 146, the audio driver 148, or other components the client computing device 140 can provide the audio input signal to the data processing system 102 (e.g., via the network 105) where it can be received (e.g., by the interface 104) and provided to the NLP component 106 or stored in the data repository 128.

The client computing device 140 can include an audio driver 148, a transducer 146, a sensor 144 and a pre-processor component 150. The sensor 144 can receive or detect an input audio signal (e.g., voice input). The pre-processor component 150 can be coupled to the audio driver, the transducer, and the sensor. The pre-processor component 150 can filter the input audio signal to create a filtered input audio signal (e.g., by removing certain frequencies or suppressing noise). The pre-processor component 150 can convert the filtered input audio signal to data packets (e.g., using a software or hardware digital-to-analog converter). In some cases, the pre-processor component 150 can convert the unfiltered input audio signal to data packets and transmit the data packets to the data processing system 102. The pre-processor component 150 can transmit the data packets to a data processing system 102 comprising one or more processors and memory that execute a natural language processor component, an interface, a speaker recognition component, and a direct action application programming interface.

The data processing system 102 can receive, via the interface, from the pre-processor component, the data packets comprising the filtered (or unfiltered) input audio signal detected by the sensor. The data processing system 102 can identify an acoustic signature from the input audio signal. The data processing system 102 can identify, based on a lookup in a data repository (e.g., querying a database), an electronic account corresponding to the acoustic signature. The data processing system 102 can establish, responsive to identification of the electronic account, a session and an account for use in the session. The account can include a profile having one or more policies. The data processing system 102 can parse the input audio signal to identify a request and a trigger keyword corresponding to the request.

The data processing system 102 can provide, to the pre-processor component 150 of the client computing device 140, a status. The client computing device 140 can receive the indication of the status. The audio driver can receive the indication of the status of the profile, and generate an output signal based on the indication. The audio driver can convert the indication to an output signal, such as sound signal, or acoustic output signal. The audio driver can drive the transducer 146 (e.g., speaker) to generate sound based on the output signal generated by the audio drive.

In some cases, the client computing device 140 can include a light source 142. The light source can include one or more LEDs, lights, display, or other component or device configured to provide an optical or visual output. The pre-processor component 150 can cause the light source to provide a visual indication corresponding to the status. For example, the visual indication can be a status indicator light that turns on, a change in color of the light, a light pattern with one or more colors, or a visual display of text or images.

The NLP component 106 can obtain the input audio signal. From the input audio signal, the NLP component 106 can identify at least one request or at least one trigger keyword corresponding to the request. The request can indicate intent or subject matter of the input audio signal. The trigger keyword can indicate a type of action likely to be taken. The trigger keyword can be a wakeup signal or hotword that indicates to the client computing device 140 to convert the subsequent audio input into text and transmit the text to data processing system 102 for further processing. For example, the NLP component 106 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 106 can parse the input audio signal to identify, determine, retrieve, or otherwise obtain the request and the trigger keyword. For instance, the NLP component 106 can apply a semantic processing technique to the input audio signal to identify the trigger keyword or the request. The NLP component 106 can apply the semantic processing technique to the input audio signal to identify a trigger phrase that includes one or more trigger keywords, such as a first trigger keyword and a second trigger keyword. For example, the input audio signal can include the sentence "I want a ride to the airport." The NLP component 106 can apply a semantic processing technique, or other natural language processing technique, to the data packets comprising the sentence to identify the request or trigger phrases "want a ride" and "airport". The NLP component 106 can further identify multiple trigger keywords, such as want and ride. For example, the NLP component 106 can determine that the trigger phrase includes the trigger keyword and a second trigger keyword.

The NLP component 106 can filter the input audio signal to identify the trigger keyword. For example, the data packets carrying the input audio signal can include "It would be great if I could get someone that could help me go to the airport", in which case the NLP component 106 can filter out one or more terms as follows: "it", "would", "be", "great", "if", "I", "could", "get", "someone", "that", "could", or "help". By filtering out these terms, the NLP component 106 may more accurately and reliably identify the trigger keywords, such as "go to the airport" and determine that this is a request for a taxi or a ride sharing service.

In some cases, the NLP component 106 can determine that the data packets carrying the input audio signal includes one or more requests. For example, the input audio signal can include the sentence "I want to purchase an audiobook and monthly subscription to movies." The NLP component 106 can determine this is a request for an audio book and a streaming multimedia service. The NLP component 106 can determine this is a single request or multiple requests. The NLP component 106 can determine that this is two requests: a first request for a service provider that provides audiobooks, and a second request for a service provider that provides movie streaming. In some cases, the NLP component 106 can combine the multiple determined requests into a single request, and transmit the single request to a third-party device 162. In some cases, the NLP component 106 can transmit the individual requests to another service provider device, or separately transmit both requests to the same third-party device 162.

The data processing system 102 can include a direct action API 108 designed and constructed to generate, based on the trigger keyword, an action data structure responsive to the request. The direct action API 108 can generate the action data structure to cause an application to perform the corresponding action. The direct action API 108 can transmit the action data structure to the application installed on the client computing device 140 to cause the client computing device 140 to perform the corresponding action or initiate an action. The action data structure generated by the direct action API 108 can include a deep link for an application installed on the client computing device 140. The application installed on the client computing device 140 can then perform the action or communicate with the application developer device 160 or a third-party device 162 to perform the action.

Processors of the data processing system 102 can invoke the direct action API 108 to execute scripts that generate a data structure to provide to an application installed on the client computing device 140, an application developer device 160, or a third-party device 162 or other service provider to obtain a digital component, order a service or product, such as a car from a car share service or an audiobook. The direct action API 108 can obtain data from the data repository 128, as well as data received with end user consent from the client computing device 140 to determine location, time, user accounts, logistical or other information to allow the third-party device 162 to perform an operation, such as reserve a car from the car share service. Using the direct action API 108, the data processing system 102 can also communicate with the third-party device 162 to complete the conversion by in this example making the car share pick up reservation.

The direct action API 108 can execute a specified action to satisfy the end user's intention, as determined by the data processing system 102. Depending on the action specified in its inputs and the parameters or rules in the data repository 128, the direct action API 108 can execute code or a dialog script that identifies the parameters required to fulfill a user request. The direct action API 108 can execute an application to satisfy or fulfill the end user's intention. Such code can look-up additional information, e.g., in the data repository 128, such as the name of a home automation service, or third-party service, or it can provide audio output for rendering at the client computing device 140 to ask the end user questions such as the intended destination of a requested taxi. The direct action API 108 can determine parameters and can package the information into an action data structure, which can then be sent to another component such as the application delivery server 110 to be fulfilled.

The direct action API 108 can receive an instruction or command from the NLP component 106, or other component of the data processing system 102, to generate or construct the action data structure. The direct action API 108 can determine a type of action in order to select a template stored in the data repository 128. The actions can be fulfilled by application provided by the application delivery server 110 and submitted by an application developer device 160. The application can perform or facilitate the performance of the action. Example types of actions can include, for example, watch action, listen action, read action, navigation action, or weather action. Types of actions can include or be configured to provide, for example, services, products, reservations, tickets, multimedia content, audiobook, manage subscriptions, adjust subscriptions, transfer digital currency, make purchases, or music. Types of actions can further include types of services or products. For example, types of services can include car share service, food delivery service, laundry service, maid service, repair services, household services, device automation services, or media streaming services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The NLP component 106 can parse the input audio signal to identify a request and a trigger keyword corresponding to the request, and provide the request and trigger keyword to the direct action API 108 to cause the direct action API to generate, based on the trigger keyword, a first action data structure responsive to the request. The direct action API 108, upon identifying the type of request, can access the corresponding template from a template repository (e.g., data repository 128). Templates can include fields in a structured data set that can be populated by the direct action API 108 to further the operation that is requested via input audio detected by the client computing device 140 (such as the operation of sending a taxi to pick up an end user at a pickup location and transport the end user to a destination location). The direct action API 108, or client computing device 140, can launch or trigger an application to fulfill the request in the input audio. For example, a car sharing service application can include one or more of the following fields: device identifier, pick up location, destination location, number of passengers, or type of service. The direct action API 108 can populate the fields with values. To populate the fields with values, the direct action API 108 can ping, poll or otherwise obtain information from one or more sensors 144 of the computing device 140 or a user interface of the device 140. For example, the direct action API 108 can detect the source location using a location sensor, such as a GPS sensor. The direct action API 108 can obtain further information by submitting a survey, prompt, or query to the end of user of the computing device 140. The direct action API can submit the survey, prompt, or query via interface 104 of the data processing system 102 and a user interface of the computing device 140 (e.g., audio interface, voice-based user interface, display, or touch screen). Thus, the direct action API 108 can select a template for the action data structure based on the trigger keyword or the request, populate one or more fields in the template with information detected by one or more sensors 144 or obtained via a user interface, and generate, create or otherwise construct the action data structure to facilitate performance of an operation by the third-party device 162.

The data processing system 102 can include, interface with or otherwise access an application delivery server 110. The data processing system 102 can include an application delivery server 110. The application delivery server 110 can be separate from the data processing system 102. For example, the application delivery server 110 can be a separate system or server from the data processing system 102. The data processing system 102 can communicate with the application delivery server 110 via network 105.

The application delivery server 110 can receive an application submitted by an application developer device 160. The application delivery server 110 can maintain one or more versions of an application. The application delivery server 110 can transmit the application to a client computing device 140. The application delivery server 110 can download the application onto a client computing device 140. The application delivery server 110 can maintain an online application store or marketplace. The application delivery server 110 can manage or maintain accounts for application developer devices 160 or client computing devices 140. The application delivery server 110 can maintain profiles for the accounts. The accounts or profiles can be associated with a unique identifier. The account can include a financial account or token account that can be used to purchase or subscribe to application. The application delivery server 110 can prompt a user of a client computing device 140 to pay for an application by providing electronic account information, such as an electronic financial account.

The application delivery server 110 can provide authentication and authorization services for the accounts of the client computing device 140 or application developer device 160. For example, the application delivery server 110 can authenticate and authorize an application developer device 160 prior to submission of the application. The application delivery server 110 can authenticate and authorize a client computing device 140 prior to allowing the client computing device 140 to download the application.

The data processing system 102 (e.g., via application delivery server 110) can receive an application submitted by the application developer device 160. The data processing system 102 can receive a new application, or an updated version of an application previously submitted. The application can be associated with one or more actions or intents. An action can refer to a messaging object. The messaging object can be configured with an action. The application developer 160 can establish the application with the messaging object and action to cause the application to fulfill the action or perform an action. The action can refer to an intent. The action can be performed on an entity. The application can be configured to perform the action on an inventory of entities. For example, the action can refer to "playing a song" and an entity can be a specific song. The application can be for a music streaming service and can be configured to fulfill a request to play a song by an artist.

The data processing system 102 can receive a data file associated with the application. The data file can include multiple actions established by the application developer device 160 for the application. The application developer device 160 can provide the data file along with the application submission to the data processing system 102. The data file can be in a format, such as a markup language, a metalanguage, a custom markup language, an extensible markup language, text, or other format.

The data file can indicate actions that the application is configured to perform or fulfill. The data file can provide an indication of an inventory of entities on which the application is configured to perform the action, or configured to access to otherwise fulfill the request or desired intent of the user. The inventory of entities can be provided as a list in the data file. The data file can include a pointer, reference, uniform resource locator, or other indicator that points to a data repository or entities. In some cases, the data processing system 102 can access the link to a webpage containing entities. The data processing system 102 can parse or otherwise process the webpage to identify the entities accessible to the application.

The data processing system 102 can perform a debugging process for the application. The data processing system 102 can perform a review process on the application. The data processing system 102 can perform the review or debugging process responsive to an event, trigger condition, request, or instruction. The data processing system 102 can perform the debugging or review process based on a time interval (e.g., periodically every 6 hours, 12 hours, 24 hours, 48 hours, 1 week, 30 days or some other time interval). The data processing system 102 can perform the debugging or review process based on a number of downloads of the application (e.g., after 100 downloads, 500 downloads, 1,000 downloads, 5,000 downloads, 10,000 downloads, or some other number of downloads). The data processing system 102 can perform the debugging or review process responsive to a negative user feedback or negative rating or negative review of the application. The data processing system 102 can perform the debugging or review process responsive to a request from a user to perform the review process.

The data processing system 102 can perform the debugging or review process responsive to receiving a new application or an update to an application. For example, the data processing system 102 can receive an indication that the application is a new application uploaded by the application developer for delivery by the application delivery server. The indication that the application is a new application can include, for example, the application developer 160 providing an indication that this is the first version of the application, providing a new name for the application that is not previously recognized or stored in the data processing system 102, or selecting a button in a user interface to indicate that the application is a new application. The data processing system 102 can determine that the application is a new version or an update to the application based on the application developer device 160 indicating that the application is the next version (e.g., sequence of version numbers), the data processing system 102 determining that an application with the same name from the same application developer device 160 already exists with the data processing system 102. The data processing system 102 can trigger, responsive to the indication of the new application or a new version of the application, a debugging process. In some cases, the data processing system 102 may determine not to trigger the debugging process for a new version of the application if the data processing system 102 had determining that the previous version of the application previously satisfied the review process, thereby reducing computing resource utilization.

The data processing system 102 can determine to perform the debugging process based on the type of application or a functionality of the application. For example, the data processing system 102 can identify, for an application submitted by an application developer, a messaging object configured with an action by the application developer. Responsive to determining that the application is configured with actions, the data processing system 102 can initiate a debugging process in order to determine whether the actions are fraudulent, misleading, or erroneous.

The data processing system 102 can determine to trigger the debugging process prior to delivery of the application for installation on any client computing device 140. In some cases, the data processing system 102 can determine to trigger the debugging process after the application has already been installed on at least one client computing device 140. For example, the data processing system 102 can determine to perform the debugging process responsive to negative feedback associated with the installed application. The data processing system 102 can receive an indication of negative feedback for the application from a client computing device 140 on which the application is installed. The data processing system 102 can trigger, responsive to the indication of the negative feedback for the application, the debugging process.

The debugging process can include determining one or more classification scores, such as a first classification score, a second classification score and a third classification score. The data processing system 102 can include, interface with or otherwise access a first classifier component 116. The data processing system 102 can include a first classifier component 116 designed, constructed and operational to determine a first classification score. The first classifier component 116 can determine the first classification score. The data processing system 102 (e.g., via the first classifier component 116) can determine the first classification score based on historical execution of the action of the messaging object provided by the application developer. The data processing system 102 can determine the first classification score based on whether previous calls to the application to perform the action resulted in fulfillment of the action. The data processing system 102 can determine the first classification score based on user feedback based on previous executions of the action by the application.

For example, multiple client computing devices 140 may have installed the application. Users of the client computing devices 140 may have requested the application to perform an action, such as play a particular song. The application may or may not have played the song responsive to the request from the user. The user of the client computing device 140, based on their previous interactions with the applications and previous execution of an action with the application, can provide feedback on the application. For example, the application delivery server 110 can provide a prompt or other graphical user interface via which the user of the client computing device 140 can provide an indication as to whether the application fulfilled the action the user requested of the application.

The rating system can include a score. The score can be stored in the score data structure 132 in data repository 128. The data processing system 102 can determine the first classification score based on feedback from users that made requests to the application. For example, users can rate the application on a scale of 1 to 5, where 5 indicates that the application fulfills requests well, and 1 indicates that the application does not fulfill requests well.

In some cases, the data processing system 102 can provide a prompt or query to a user of the client computing device 140 to obtain information about the application. The data processing system 102 (e.g., via first classifier component 116) can construct a prompt or query to obtain information about the application and whether the application can fulfill certain types of actions or requests. The data processing system 102 can determine, from application data 130, a category of the application or a type of the application (e.g., ridesharing, music service, news, or weather). The data processing system 102 can determine types of actions configured for the application from a data file submitted with the application that lists actions configured or established by the application developer device 160 for the application. Using the application data 130, the data processing system 102 can construct a query or survey. For example, the application data 130 can indicate that the application is a ridesharing application. The data processing system 102 can determine that an action of the application may be to provide a ride to a user. The data processing system 102 can generate a query such as "Does Application_A provide rides?" The data processing system 102 can transmit the query to a client computing device 140 that has installed the application. The data processing system 102 can provide the query to a client computing device 140 that has executed the action for the application. The data processing system 102 can determine whether the client computing device 140 has downloaded, installed, or executed the action for the application based on account information stored in the data repository 128, or information stored on the client computing device 140.

The data processing system 102 can obtain feedback from users of the client computing device 140 as to whether the application is configured to fulfill the actions the application developer 160 indicates that the application is configured to fulfill. The first classification score can indicate whether an action corresponding to the application is satisfied based on a comparison of the first classification score with a threshold (e.g., threshold 138 stored in data repository 128).

The first classifier component 116 can obtain feedback from users of client computing devices 140 in various forms, including, for example, written reviews, scores, responses to surveys, responses to queries, users uninstalling the application after trying to execute an action, or other types of feedback. The first classifier component 116, using one or more types of feedback, can generate the first classification score. For example, the first classifier component 116 can determine an average score from the individual ratings, and use the average score as the first classification score. The first classifier component 116 can combine two or more different types of feedback scores to generate a single feedback score as the first classification score. To generate the first classification score, the first classifier component 116 can combine the different types of feedback scores by multiplying the scores, adding the scores, taking a dot product of the scores, inputting the scores into a function, or otherwise combining the scores. The first classifier component 116 can combine the scores by taking an average of the different scores. The first classifier component 116 can combine the scores by applying a weight to the different scores before combining the scores. The first classifier component 116 can generate the first classification score as a weighted average of the different scores. The first classification component 116, to generate the first classification score, can reformat, translate, transform or otherwise manipulate the individual feedback scores from the different feedback sources. For example, the data processing system 102 can generate a first feedback score from parsing reviews of the application, a second feedback score based on user ratings of the application in an online application delivery marketplace managed by the application delivery server 110, and a third feedback score based on survey results from users. The data processing system 102 can convert each of these different feedback scores into a normalized feedback score, and then combine the normalized scores (e.g., via an average) in order to generate the first classification score. The first classification component 116 can store the first classification score in the score data structure 132 for further processing by the data processing system 102.

The data processing system 102 can include, interface with or otherwise access an action generator 124 designed, constructed and operative to generate a machine generated action for the application based on metadata associated with the application. The data processing system 102 can generate an action based on application data 130, including, for example, a title of the application, short description, long description, metadata, entities, content, or user reviews. The action generator 124 can take, as input, the name, short description, long description, user reviews or other sources to extract nouns and verbs. The action generator 124 can map the nouns and verbs (e.g., artist name, or play music) to actions or intents such as "play a song." Thus, the action generator 124 can map application information to a machine generated action. The action generator 124 can map the application information absent the list of actions provided by the application developer device 160 along with the submission of the application. The action generator 124 can generate the machine generated action without using the actions listed or identified in the data file provided by the application developer device 160. By using metadata such as the title, description or user reviews for the application, the action generator 124 can generate a machine generated action independent of information about actions provided by the application developer device 160. Generating machine generated actions independent of using the actions listed in the data file by the application developer, the data processing system 102 can review the actions identified by the developer as being configured for the application.

The action generator 124 can map application data 130 to a predetermined list of actions in order to create the machine generated action for the application. The predetermined list of actions can be provided by an administrator of the data processing system 102 or an administrator of the application delivery server 110. The predetermined list of actions can include or refer to a list of actions that the direct action API 108 of the data processing system 102 is configured to execute or perform. The predetermined list of actions can be categorized. The predetermined list of actions can be categorized based on different types of actions. Types of actions can include, for example, music actions, ridesharing actions, navigation actions, news actions, ticket purchase actions, or other types of actions.

The action generator 124 can identify the machine generated action by mapping application data 130 to the predetermined list of actions. For example, the predetermined list of actions for a music application can include: play a song, play an album, next song, replay, pause, start a radio station, or create a playlist. In another example, the predetermined list of actions for a ridesharing application can include: order a ride to [destination]; what is the estimate to go to [destination]; how far away is my ride?; cancel ride; or what type of car is picking me up? The action generator 124, based on one of these predetermined actions, can identify the machine generated action that maps to an application.

The action generator 124 can convert entities to intents or actions to generate the machine generated actions. For example, the data file submitted along with the application can include both intents and entities. The data processing system 102 can parse the entities to generate machine generated actions that can be performed on the entities.

The data processing system 102 can generate the machine generated actions based on metadata or descriptions provided for the application. The data processing system 102 can identify discrete objects and combine them into a cluster of text, and input the cluster of text to a mapping technique that can output nouns and verbs. The data processing system 102 can then convert the nouns and verbs to intents using a hierarchical graph. The data processing system 102 can traverse the graph to identify the intent or action.

The data processing system 102 can perform a lookup using the entities submitted by the application developer. The lookup table can map entities to intents or actions. The data processing system 102 can perform a lookup to determine what actions are typically associated with the entities. The data processing system 102, using the intents typically associated with the entities and other techniques, can generate the machine generated action.

The data processing system 102 can include, interface with or otherwise access a second classifier component 118 designed, constructed and operative to determine a second classification score based on a comparison of the action of the messaging object provided by the application developer with the machine generated action. The second classifier component 118 can compare the actions to determine whether there is a match. The second classifier component 118 can compare the one or more actions provided by the application developer device 160 with the one or more machine generated actions generated by the action generator 124. The second classification score can be based on different types of matching or comparison techniques. The second classifier component 118 can determine how many of the actions are a match, the level of match, the level of overlap, or otherwise compare the two sets of actions. For example, the application developer device 160 can submit, along with the application, five different actions. The action generator 124 can identify five machine generated actions based on the application data 130, and absent the list of actions submitted by the application developer device 160. The second classifier component 118 can compare the five actions provided by the application developer device 160 with the five actions generated by the action generator 124 to determine the number of actions that match, if any. The second classifier component 118 can generate the second classification score based on the level of matching. The second classification score can be a percentage based on the ratio of machine generated actions to developer provided actions (e.g., # of machine generated actions that match the developer provided actions divided by the number of developer provided actions). If all five actions match each other, then the data processing system 102 can determine the second classification score is a 100% match; if four of the machine generated actions match out of the five developer provided actions, then the data processing system 102 can determine the second classification score is 80% match; if three out of five actions match, then the data processing system 102 can determine the second classification score is 60%; if two out of five, then 40% match; if one out of five, then 20% match; if 0 out of five, then 0% match. The data processing system 102 can store the second classification score in the scores 132 data structure for further processing.

The data processing system 102 can include, interface with or otherwise access a matching engine component 122 designed, constructed and operative to select a second application that matches the application. The matching engine component 122 can use a matching program to select the second application that matches the application. The matching engine component 122 can match applications based on application data 130. The matching engine component 122 can match applications based on, for example, the short description, detailed description, category, user reviews, or other information. The matching engine component 122 can match applications based on previous version of the application.

The data processing system 102 can determine that the application matches the second application based on a similarity score between the application and the second application greater than a similarity threshold. The similarity score can be generated using the matching program. The matching engine component 122 can match a first application with a second application based on the category of the application or a description of the application. For example, the description of the first application can be "ridesharing" and the description of the second application can be "ridesharing" or "carpool" or "taxi service" or "ride service". The data processing system 102, based on the descriptions, can determine that the first application is a match with the second application. The matching engine component 122 can generate a similarity score based on comparing keywords associated with metadata or application data 130 between the application and the second application. The data processing system 102 can determine the similarity score by determining a distance between the keywords associated with the two applications using a statistical similarity measure or similarity function. The similarity function can be a real-valued function that quantifies the similarity between two objects. The similarity function can output a similarity score. The similarity function can output a distance metric that can be based on coordinates. The similarity score can correspond to a Euclidean distance between two points, where the two points are mapped onto a Euclidean space based on keywords or features associated with the two applications. Other similarity distances can include, e.g., Manhattan distance.

The data processing system 102 can determine the two applications are a match if their similarity scores are greater than a threshold. The threshold can refer to a score threshold (e.g., 80% match). For example, the data processing system 102 can first determine the two applications with the highest level of similarity. The data processing system 102, in some cases, determine to use the selected matching application without further checking the similarity score. In some cases, however, the data processing system 102 can further determine the similarity score and determine to select the second application as the matching application for debugging purposes if the similarity score is also greater than a threshold (e.g., 70% similarity, 80% similarity, 90% similarity).

In another example, the categories of the first and second applications can both be "music". The matching program can be configured to perform a first level match of applications based on the applications being in the same category. The matching program can further be configured to determine a second level of match based on the description of the applications (e.g., both descriptions indicating online music streaming service).

The matching engine component 122 can select the second application that matches the application undergoing the debugging process. The matching engine component 122 can provide the indication of the matching second application to the third classifier component 120 in order to generate the third classification score.

The data processing system 102 can include, interface with or otherwise access a third classifier component 120 designed, constructed and operative to determine a third classification score. The third classifier component 120 can determine the third classification score based on a comparison of an action approved for the second matching application with the action of the messaging object provided by the application developer for the application undergoing the debugging or review process. The third classifier component 120 can compare the level of match between the actions to generate the third classification score. The third classifier component 120 can compare the actions provided by the application developer device 160 with the actions associated with the second matching application to determine the number of actions that match, if any. The third classifier component 120 can generate the third classification score based on the level of matching. The third classification score can be a percentage based on the ratio of the actions of the second matching application to developer provided actions (e.g., # of second application actions that match the developer provided actions divided by the number of developer provided actions). If all actions match each other, then the data processing system 102 can determine the second classification score is a 100% match. If not all of the actions match one another, then the third classification score can be less than 100%. For example, there may be five actions provided by the application developer device 160 for the application undergoing the debugging or review process. There may be five actions associated with the second matching application identified by the matching engine component 122. If four of the second application actions match out of the five developer provided actions, then the data processing system 102 can determine the second classification score is 80% match; if three out of five actions match, then the data processing system 102 can determine the second classification score is 60%; if two out of five, then 40% match; if one out of five, then 20% match; if 0 out of five, then 0% match. The data processing system 102 can store the third classification score in the scores 132 data structure for further processing. The data processing system 102 can determine the score using various matching techniques, scoring techniques, labels, or classifications.

The data processing system 102 can include, interface with or otherwise access a delivery controller component 112 designed, constructed and operative to update a delivery control parameter based on the first classification score, the second classification score and the third classification score. The delivery controller component 112 can combine the first classification score, second classification score, and third classification score to generate a combined classification score. However, in other examples, the delivery controller component 112 can combine any of the first classification score, second classification score, and/or third classification score and optionally other classification scores to generate a combined classification score. The delivery controller component 112 can determine whether to block delivery of the application or authorize delivery of the application based on the combined classification score. The delivery controller component 112 can determine whether to block an action associated with the application, or authorize the action, based on the combined classification score. The delivery controller component 112 can update a delivery control parameter based on the combined classification score. For example, the delivery control parameter can include a value, a flag, a binary value, or a switch. The delivery control parameter can instruct the application delivery server 110 to block or prevent delivery of the application, or disable an action associated with the application. The delivery control parameter can block delivery of the application, or disable the action, in order to prevent malicious, fraudulent, misleading or erroneous remote procedure calls or content delivery responsive to user requests for an action. The data processing system 102 can control, responsive to the delivery control parameter updated by the data processing system, delivery of the application by the application delivery server 110.

The delivery controller component 112 can determine to authorize delivery of the application based on the first classification score, the second classification score and the third classification score. The delivery controller component 112 can determine to authorize delivery based on each of the scores individually satisfying a threshold (or respective threshold stored in threshold 138 data structure). The delivery controller component 112 can determine to authorize delivery based on a sum of the three scores satisfying a threshold. The delivery controller component can determine to authorize delivery based on an average of the three scores satisfying a threshold. The data processing system 102 can update the delivery control parameter to cause delivery of the application by the application delivery server 110.

The delivery controller component 112 can determine a classification failure based on at least one of the first classification score, the second classification score or the third classification score being less than a failure threshold. The data processing system 102 can retrieve the failure threshold from the threshold data structure 138. The data processing system 102 can compare each of the first, second and third classification scores with the failure threshold (or a respective failure threshold). If any one of the classification scores does not satisfy the failure threshold, then the data processing system 102 can determine to block delivery of the application. For example, the data processing system 102 can update, responsive to the classification failure, the delivery control parameter to block delivery of the application by the application delivery server 110. By disabling or preventing delivery of the application if any one of the classification scores fails, the data processing system 102 can prevent fraudulent or erroneous applications from being delivered. For example, the data processing system 102 can determine that the first classification score, which can be based on user feedback, may not satisfy the failure threshold, whereas the second and third classification scores may satisfy the failure threshold. However, the data processing system 102 may nonetheless determine to block delivery of the application because the feedback-related classification score does not satisfy the failure threshold, thereby indicated that the application may be fraudulent or erroneous or otherwise not be suitable for delivery to client computing devices 140.

The data processing system 102 can determine a classification failure based on the first classification score, the second classification score and the third classification score. The data processing system 102 can determine the classification failure based on a combination of the three scores, or each of the scores individually. The data processing system 102 can automatically update, responsive to the classification failure, the delivery control parameter to block delivery of the application by the application delivery server 110. The data processing system 102 transmit a notification to the application developer device 160 of the classification failure. The application developer device 160, upon receiving the notification, can debug their application to fix or correct the issues causing the classification failure. The data processing system 102 can request, responsive to the classification failure, an updated version of the application from the application developer device 160. The data processing system 102 can transmit a request (e.g., message, electronic message, notification, push message, or prompt) to the application developer device 160 stating that the application failed the review or debugging process. The data processing system 102 can provide additional information as to which action of the application resulted in failure of the review or debugging process. The data processing system 102 can provide additional information as to which classifier in the review process resulted in the application failing the review or debugging process.

The data processing system 102 can determine to authorize the application for delivery even if one or more of the actions associated with the application fails the review or debugging process. The delivery controller component 112 can determine, for an action of the messaging object, a classification failure based on the first classification score, the second classification score and the third classification score. The delivery controller component 112 can automatically disable, responsive to the classification failure, the action of the messaging object for execution via the application. The data processing system 102 can authorize the application for delivery by the application delivery server 110 such that when the application is delivered to a client computing device 140, the action is disabled and not executable on the client computing device 140. Thus, even though the application may have been initially configured by the application developer 160 with an action that may be fraudulent, misleading or erroneous in some manner, the data processing system 102 can provide the application for delivery to the client computing device 140 without causing a waste in computing resource utilization because the data processing system 102 can pre-emptively disable the action of the application, thereby preventing the fraudulent, misleading or erroneous action from being performed. The application delivery server 110 can determine to disable one or more actions based on the delivery control parameter stored in parameter data structure 136 for the application. The delivery control parameter can include a data structure listing authorized actions for the application. By removing a fraudulent action, then the data processing system 102 can prevent the application from being triggered responsive to the action. In another example of disabling an action, the data processing system 102 can remove the unauthorized action from a data file associated with the application. The data file can be the data file submitted by the application developer device 160 along with the submission of the application.

For example, the data processing system 102 can identify actions established for the application via the data file. The data processing system 102 can determine, via a debugging process for each of the actions, a first classification score, a second classification score and a third classification score. The data processing system 102 can update the delivery control parameter to disable one or more of the actions based on the debugging process.

The data processing system 102 can authorize or disable actions for an application. The data processing system 102 an authorize or disable actions from being executed on particular digital surfaces. Digital surfaces can include, for example, mobile computing device surface, smart speaker surface, voice-only interface, display surface, chatbot surface, webpages, navigation application, or other types of digital surfaces. The data processing system 102 can identify digital surfaces for execution of the action of the messaging object of the application. The data processing system 102 update the delivery control parameter to disable execution of the action of the messaging object of the application on a digital surface of the multiple digital surfaces.

The data processing system 102 can determine to exit the debugging process prior to determining each of the first, second and third classification scores for the application or an action of the application. The data processing system 102 can determine to exit the debugging process without executing each of the first classifier component 116, second classifier component 118 and third classifier component 120 for the application or an action of the application. For example, the data processing system 102 can determine that one of the first classification score or the second classification score does not satisfy a failure threshold. Responsive to determining that one of the first classification score or second classification score does not satisfy the failure threshold, the data processing system 102 can determine to skip determining the third classification score in order to reduce computing resource utilization of the data processing system 102.

For example, the data processing system 102 can trigger a debugging process for an application. The data processing system 102 can determine, via the debugging process for the application, a first classification score for the application. The data processing system 102 can detect a first classification failure based on a comparison of the first classification score for the application with a first classification threshold. The first classification threshold can be retrieved from threshold data structure 138 stored in data repository 128. The data processing system 102 can exit, responsive to detection of the first classification failure, the debugging process for the application prior to determining a second classification score for the application or a third classification score for the application. The data processing system 102 can transmit a notification of the first classification failure to an administrator device of the data processing system 102 or the application developer device 160. By exiting the debugging process subsequent to detecting the classification failure, the data processing system 102 can both reduce computing resource utilization and also expedite completing the application review and providing the results of the review to the application developer device 160.

The data processing system 102 can include, interface with or otherwise access a deep link builder component 114 designed, constructed and operative to generate a deep link for an application. The data processing system 102 can debug or review the application to determine whether the deep link for the application causes the application to perform a function or provide a content item that is responsive to the requested action. For example, the data processing system 102 can debug the application to determine whether the deep link for the application actually directs a user to a proper screen or state in the application based on the desired action. The deep link builder component 114 can generate the deep link based on actions, entities, and a template provided for the application. A deep link can refer to a hyperlink or other reference or pointer that links to a specific piece of content, such as a specific state or screen in an application, as opposed to a home page or initial state or screen of the application. Deep linking can refer to a link that points to a page or content that is beyond the highest-level home page or screen or state.

The data processing system 102 (e.g., via deep link builder component 114) can generate a deep link for the application. The data processing system 102 can build a deep link for to book a ride to a specific destination, for example. However, the data processing system 102 can determine that the deep link into the application may take the user to a page that does not wish to fulfill the intent of the user. Instead, the deep link into the application may direct the user to malicious or abusive content. Thus, the deep link builder component 114 can determine whether the deep link constructed pursuant to the template, actions and entities of the application would fulfill a user's intent. The data processing system 102 can therefore perform quality review by determining if the deep links directs the user to the desired action and helps fulfill the intent of the user. To perform quality review, the data processing system can determine whether the intent allegedly being provided by the application is actually provided by the application. For example, a developer of a music streaming service can provide an application with entities for an artist and song. The user may request a song by the artist, which might cause the application to provide a deep link to be provided that directs the user directly to the page of the artist within the application. However, if the deep link ends up directing the user to a page of a different artist or a different type of page (e.g., audio books), then the data processing system 102 can determine that the deep link may be erroneous.

Figure 2:
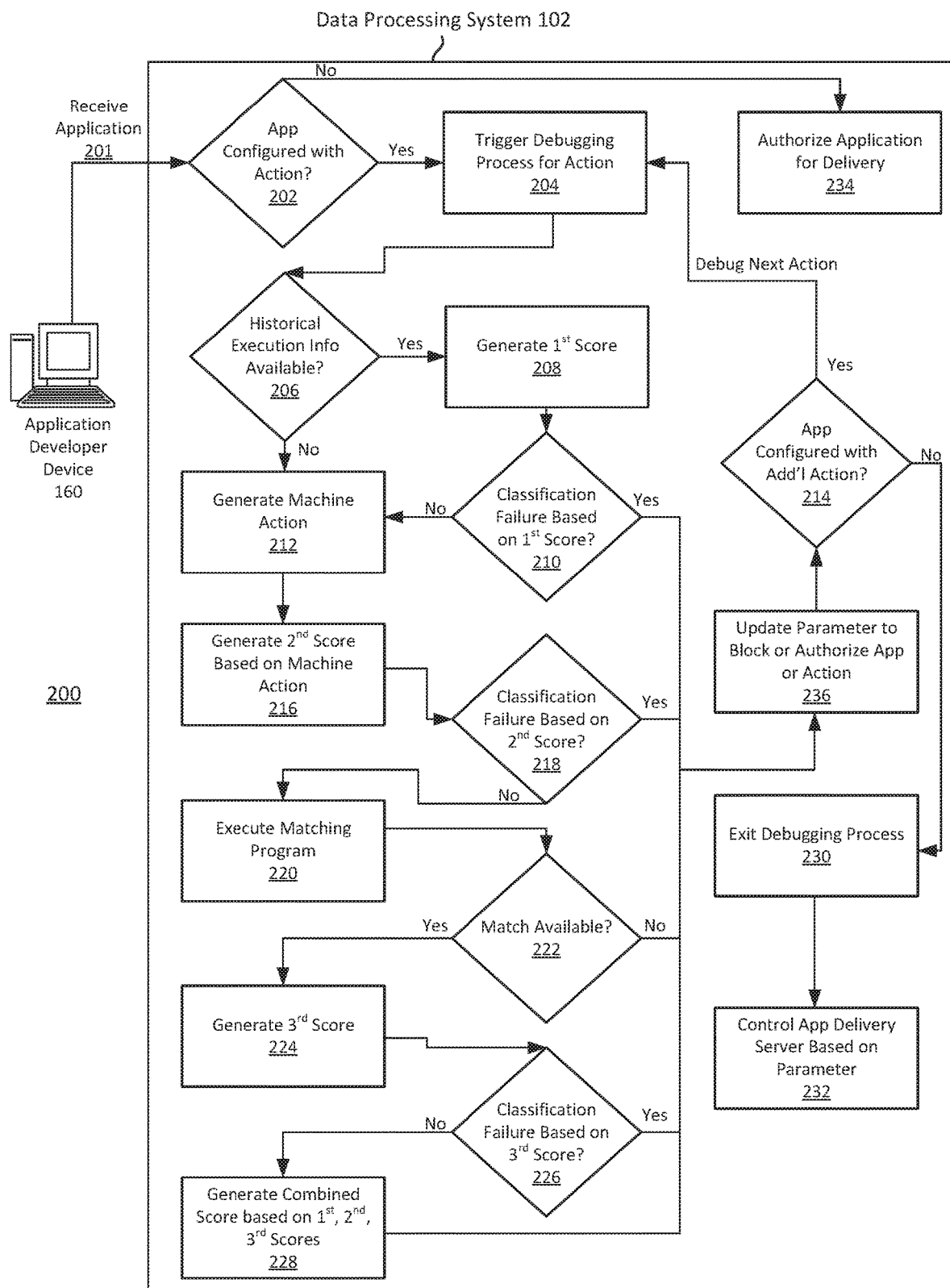
FIG. 2 is an illustration of an example operation of a system to debug applications.

FIG. 2 is an illustration of the operation of system 200 to debug applications. The system 200 can include one or more component of system 100 depicted in FIG. 1 or system 400 depicted in FIG. 4. System 200 can include a data processing system 102. The data processing system 102 can communicate, interface with, or otherwise interact with an application developer device 160.

At ACT 201, the data processing system 102 receive an application. The data processing system 102 can receive the application from the application developer device 160. The application developer device 160 can be associated with a unique developer account, such as a username and authentication credentials. The application developer device 160 can submit the application to the data processing system 102 for delivery via an application delivery server or online application marketplace. The data processing system 102 can receive the application along with application data, such as metadata, a data file, list of actions, inventory of entities, or other information.

At ACT 202, the data processing system 102 can determine whether the application is configured with an action. The data processing system 102 can determine whether the application is associated with an action. The data processing system 102 can determine whether the application developer has established an action for the application. The developer can submit actions along with the application using a data file, such as an XML file. The actions can be established or configured by the developer for execution by the application. Actions can include or trigger deep links into specific screens, webpages or states in the application. The deep link can be created by a deep link builder of the data processing system 102 responsive to a request from a user triggering an action established for the application.

The data processing system 102 can determine whether the application is configured with an action based on parsing an application data file or other information provided by the application developer device 160.

If the data processing system 102 determines that the application is not configured with an action at ACT 202, then the data processing system 102 can proceed to ACT 234 to authorize the application for delivery. If, however, the data processing system 102 determines at ACT 202 that the application is configured with an action, then the data processing system 102 can proceed to ACT 204 to trigger a debugging process for the action.

At ACT 204, the data processing system 102 can trigger the debugging process. The data processing system 102 can trigger the debugging responsive to submission of an application by the application developer or on an on-going basis. The data processing system 102 can trigger the debugging process responsive to determining that there is sufficient historical execution information available at ACT 206 to generate a first classification score at ACT 208. For example, if there is insufficient historical execution information (e.g., limited user feedback such as less than 10, 20, 30, 50, 100, 150, 200, 300, or 500 user ratings, reviews, or responses to survey prompts), then the data processing system 102 can determine not to trigger the debugging process and continue to authorize the application at ACT 234 until there is sufficient user feedback.

The data processing system 102 can determine, at ACT 206, whether there is historical execution information available for the application. Historical execution information can refer to or include user feedback associated with the application or the action of the application being debugged. The data processing system 102 can access a data repository storing historical information to determine if there is historical execution information available for the application at ACT 206. The data processing system 102 can query the data repository 128, or historical data data structure 134 at ACT 206. The data processing system 102, in some cases, can determine whether historical execution information exists based on whether the application being submitted is a new application that has not been previously submitted. If the application is a new application that has not been previously submitted, then historical execution information may not exist.

If historical execution information does not exist, the data processing system 102 can determine to proceed to a second classifier and skip a first classifier. If historical execution information does not exist, the data processing system 102 can determine to insert a delay or wait until historical execution information exists. For example, the data processing system 102 can temporarily authorize the application for delivery in order to cause the application and action thereof to be installed and executed on client computing devices 140. The application, upon being installed and executed, can generate historical execution information that the data processing system 102 can then use to determine a first classification score.

If, at ACT 206, the data processing system 102 determines that historical execution information is available, the data processing system 102 can proceed to ACT 208 to generate a first classification score. The data processing system 102 (e.g., via a first classifier component 116) can generate the first classification score using a first classifier component of the data processing system 102. The first classification score can be based on the historical execution or feedback data thereof. The first classification score can indicate whether the actions provided for the applications fulfilled an intent of a user triggering the action. The first classification score can be a feedback rating provided by users, user responses to a survey, user reviews or other feedback provided by users.

The data processing system 102 can then determine whether there is a classification failure based on the first classification score at ACT 210. The classification failure can be based on a threshold. If the data processing system 102 determines, at ACT 210, a classification failure based on the first classification score, the data processing system 102 can proceed to ACT 236 to update a parameter (e.g., delivery control parameter) to block the application for delivery or disable the action of the application. The data processing system 102 can then determine at ACT 214 whether the application is configured with additional actions. If the application is configured with additional actions, then the data processing system 102 can debug the next action by triggering the debugging process at ACT 204 with the next action. If the data processing system 102 determines that there are no further actions to review or debug for the application, the data processing system 102 can exit the debugging process at 230. The data processing system 102 can then control the application delivery server based on the parameter at ACT 232.

If, at ACT 210, the data processing system 102 determines that the first classification does not result in classification failure, the data processing system 102 can proceed to ACT 212. At ACT 212, the data processing system 102 can generate a machine action. A machine action can refer to a machine generated action. A machine action can refer to a simulate action or action generated by the data processing system 102 based on application data or metadata. A machine action or machine generated action can refer to an action generated or identified by the data processing system 102 absent using the list of actions provided by the application. A machine action can refer to an action generated by the data processing system 102 independent of the list of actions provided by the application developer device 160.

Upon generating the machine action at ACT 212, the data processing system 102 can proceed to ACT 216 to generate a second classification score based on the machine action. The data processing system 102 (e.g., via a second classifier component 118) can determine the second classification score based on a comparison of the machine generated action with an action provided by the application developer device 160. The data processing system 102 can determine at ACT 218 whether a classification failure occurs as a result of the second score. The classification failure can refer to or include the second score being a null value or not satisfying a minimum failure threshold. The classification failure can cause the data processing system 102 to exit the debugging process. The data processing system 102 can exit the debugging process responsive to classification failure so as to reduce or prevent wasted computing resource consumption.

If, at ACT 218, the data processing system 102 determines that there is a classification failure based on the second score, the data processing system can proceed to ACT 236 to update the delivery control parameter and block the application or action.

If, however, at ACT 218 the data processing system 102 determines that there is no classification failure, then the data processing system 102 can proceed to ACT 220 to execute a matching program. The data processing system 102 can use a matching engine component 122 to execute the matching program. The matching program can be executed to identify a second application that is similar to the application. Similarity can be determined using various techniques, including, for example, a statistical technique. Similarity can be based on applications being in the same category, the same type of application, providing similar functions, providing similar services, or using similar functions or tools. The data processing system 102 can select a similar application based on titles, descriptions, metadata, categories, users, reviews, or other data sources (e.g., external data sources, third-party devices 162, search engine results). For example, the data processing system 102 can leverage or utilize a search engine to identify similar applications. The data processing system 102 can input information about the application into a search engine and parse the search results to identify a similar application.

At ACT 222, the data processing system 102 can determine whether there is a similar application. If the data processing system 102 is unable to identify a similar application, then the data processing system can proceed to ACT 236 to update the delivery control parameter without generating a third classification score. The data processing system 102 can update the delivery control parameter using the first classification score and the second classification score. The data processing system 102 may not find a similar application because similar application may not yet have been submitted to the data processing system 102 for application delivery. The data processing system 102 can select a similar application as being configured with actions. The data processing system 102 may not find a similar application if the applications that are otherwise similar are not configured with actions.

If the data processing system 102 determines that there is a similar application configured with actions at ACT 222, then the data processing system 102 can proceed to ACT 224 to generate a third classification score. The data processing system 102 can use a third classifier component to generate the third classification score. The data processing system 102 can compare the action configured for the application with actions configured for the similar application to determine a level of similarity between the actions. For example, the data processing system 102 can determine that the action of the application that is undergoing the debugging process either matches or does not match with any action established for the similar application. If the data processing system 102 determines that the action undergoing the debugging process does not match with any action of the similar application, then the data processing system 102 can assign the action a low classification score (e.g., 0). If the data processing system 102 determines that the action of the application undergoing the debugging process matches with one of the actions established for the similar application, then the data processing system 102 can assign the action a high third classification score (e.g., 1). Thus, the data processing system 102 set a higher classification score if the action matches an action established for a similar application that has already been vetted or approved by the data processing system 102.

At ACT 226, the data processing system 102 can determine whether there is a classification failure based on the third classification score. If the data processing system 102 determines a classification failure based on the third classification score, then the data processing system 102 can proceed to ACT 236 to update the delivery control parameter to block authorization of the application for delivery, or disable the action for the application.

If the data processing system 102 determines that the third classification score does not result in a classification failure at ACT 226, then the data processing system 102 can proceed to generate a combined classification score at ACT 228. The data processing system 102 can generate a combined classification score based on the first classification score, second classification score and third classification score. The data processing system 102 can combine the classification scores using any technique, including, for example, addition, multiplication, division, dot product, function, average, or a statistical technique.

The data processing system 102 can update the delivery control parameter at ACT 236 based on the combined score generated at ACT 228. The data processing system 102 can update the parameter to block delivery of the application, disable the action, or authorize delivery or authorize the action. The data processing system 102 can then determine, at ACT 214, whether the application is configured with additional actions. If the data processing system 102 determines that there are additional actions to be reviewed, the data processing system 102 can proceed to ACT 204 to debug or review the next action. If, at ACT 214, the data processing system determines that there are no remaining actions to be input into the debugging process, then the data processing system 102 can proceed to ACT 230 to exit the debugging process.

The data processing system 102 can control the application delivery server 110 at ACT 232 based on the parameter. For example, the parameter can instruct the application delivery server 110 to authorize delivery of the application or block delivery of the application. The parameter can instruct the application delivery server 110 to disable one or more action of the application, but otherwise authorize delivery of the application. The data processing system 102 can notify the application developer device 160 of the status or result of the debugging process. The data processing system 102 can request the application developer device 160 to resolve low classification scores identified by the data processing system 102 by improving corresponding aspects of the application.

Figure 3:
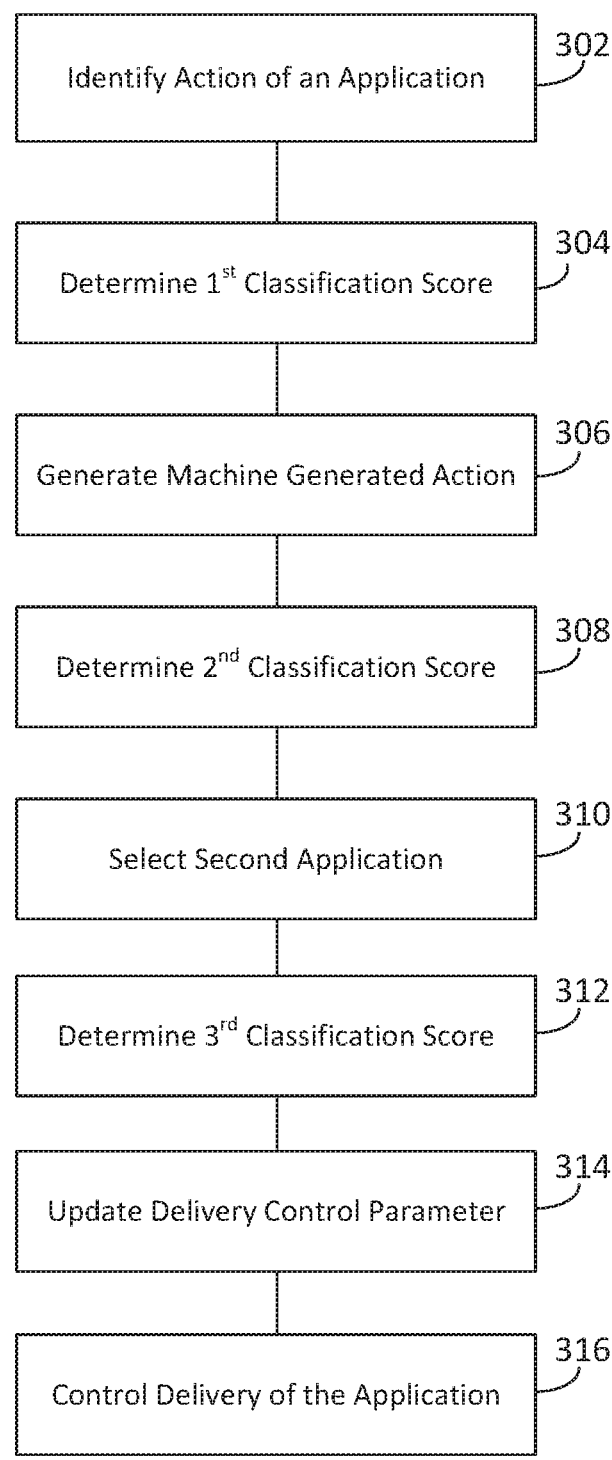
FIG. 3 is an illustration of an example method of debugging applications.

FIG. 3 is an illustration of an example method of debugging applications. The method 300 can be performed by one or more component, system or element of system 100 depicted in FIG. 1, system 200 depicted in FIG. 2, or system 400 depicted in FIG. 4. For example, the method 300 can be performed by a data processing system. At ACT 302, the data processing system can identify an action of an application. The application can be submitted by an application developer. The action can be a message object configured by the application developer to perform an action associated with the application. The action can include, for example, a watch action, a listen action, a content request action, a navigation action, or other type of action. The action can be performed by the application. The action can be performed on an entity associated with the application (e.g., play Song_A by Artist_1).

At ACT 304, the data processing system can determine a first classification score. The data processing system can determine a first classification score based on historical execution of the action of the messaging object provided by the application developer. The data processing system can determine the first classification score based on user feedback. The data processing system can determine the first classification score based on user reviews. The data processing system can determine the first classification score based on semantic analysis of user reviews or feedback. The data processing system can determine the first classification score based on a survey or user responses to a survey. The data processing system can determine the first classification score based on user responses to a prompt, such as "can the application perform <action>?" The action can correspond to the action the application developer indicates the application is configured to perform.

In some cases, the data processing system can determine that the application does not have historical execution information. The data processing system can determine to skip the generation of the first generation score, or assign a default value for the first classification score. For example, the data processing system can provide a default value for the first classification score such that the application can pass a classification failure test. In some cases, the data processing system can determine to pause the debugging process and authorize the application for delivery in order to obtain user feedback on the application.

At ACT 306, the data processing system can generate machine generated actions. The data processing system can a machine generated action for the application based on metadata associated with the application. The data processing system can generate the machine generated action without using the actions submitted by the application developer. The data processing system can generate the machine generated actions independent of the actions submitted by the application developer. The data processing system can generate the machine generated actions based on a description of the application or other metadata associated with the application.

At ACT 308, the data processing system can determine a second classification score. The data processing system can determine the second classification score based on a comparison of the action provided by the application developer with the machine generated action. If the action provided by the developer matches the machine generated action, the data processing system can assign the action a high second classification score (e.g., a 1). If the action provided by the developer does not match the machine generated action, then the data processing system can assign the action a low second classification score (e.g., 0). If the action does not exactly match the machine generated action, but is similar, then the data processing system can assign a medium second classification score to the action (e.g., 0.5). The action provided by the developer may be similar to the machine generated action if the actions are in a similar domain or category or vertical. For example, the data processing system can consider the listen action to be similar to a watch action.

At ACT 310, the data processing system can select a second application. The second action can be a similar application. The data processing system can select the similar action using a matching program. The second application can match, or be considered similar to, the application undergoing the debugging process. The data processing system can select or identify the similar application based on metadata associated with the application. The data processing system may identify multiple similar applications. The data processing system can select the application that is the most similar based on a similarity ranking of similarity scores (e.g., statistical similarity scores). The data processing system can select the similar application that is configured with actions. The data processing system can determine to select the similar application for further processing if it contains or is configured with actions. For example, if the data processing system identifies to similar applications, but only one of the applications is configured with actions, then the data processing system can select the application configured with actions as the similar application (or second application) to be used for the debugging process.

At ACT 312, the data processing system can determine a third classification score. The data processing system can determine the third classification score based on a comparison of an action approved for the second application (e.g., selected similar application) with the action of the application by the application developer. If the action provided by the application developer matches an action configured for the similar application, then the data processing system can set a high third classification score (e.g., 1). If the action provided by the developer does not match any action configured for the similar application, then the data processing system can set a low third classification score (e.g., 0). If the action does not exactly match any action of the second application, but is similar, then the data processing system can assign a medium second classification score to the action (e.g., 0.5). The action provided by the developer may be similar to an action of the second application if the actions are in a similar domain or category or vertical. For example, the data processing system can consider the listen action to be similar to a watch action.

At ACT 314, the data processing system can update a delivery control parameter. The data processing system can update the delivery control parameter based on the first classification score, the second classification score and the third classification score. The data processing system can update the delivery control parameter for a particular action or the entire application. The data processing system can update the delivery control parameter based on one of the classification scores, or a combination of the classification scores. For example, if one of the classification scores is below a minimum threshold (e.g., a failure threshold), then the data processing system can determine to block delivery of the application or disable the action regardless of whether the other classification scores are satisfactory. In some cases, the data processing system can combine the three classification scores to determine whether the action or application is satisfactory or passes the review process. If the action or application passes the review process, the data processing system can update the delivery control parameter to authorize the application or action for delivery.

At ACT 316, the data processing system can control delivery of the application. The data processing system can control delivery of the application by the application delivery server. The data processing system can control delivery responsive to the delivery control parameter updated by the data processing system. The data processing system can instruct an application delivery server that can be internal or remote from the data processing system. The data processing system can instruct an online application marketplace to disable the action or block delivery of the application. Blocking delivery of the application can include removing the application from the application store. Blocking delivery of the application can include reverting the application to a previous version that passed the review process.

The data processing system can provide a notification to the application developer regarding the results of the debugging process.

Thus, the systems and methods of the present technical solution can debug applications or improve the application debugging process in order to prevent the delivery of fraudulent or erroneous applications. For example, developers can provide an XML file as part of an application packet kit for an application. The XML file can include intents and entities for the application, where intents can refer to actions the application can perform and entities can include or refer to content on which the action can be performed. The developer can indicate a large number of entities for an application (e.g., millions of songs for a music streaming application). A request or trigger for an action on an entity can cause the generation of a deep link to the application. For example, a client computing device can detect the request and generate a deep link for the action and the entity. The deep link can direct the application to a particular state or a particular web page. Thus, due to the number of intents or large number of entities, it can be challenging to review or debug applications to determine whether the deep links generated for the application are fraudulent, erroneous, or otherwise misleading or incorrect.

The data processing system of the present technical solution can determine whether the application can actually perform the action, whether the application can actually access the entity, or whether the actually can perform the action on the entity.

The data processing system can use one or more classifiers that generate one or more scores indicating whether the application can fulfill the intent. The data processing system can be configured to use all three classifiers in order to improve reliability. For example, if any one classifier fails, then the data processing system can determine to remove the application or disable the action. The data processing system can perform the review process on a per action basis, or for the entire application. The data processing system can automatically disable the action based on any one of the classifiers failing. The data processing system can automatically disable the action for a particular digital surface (e.g., voice-based digital assistant, search, or content request). The data processing system can provide, to the application developer, a log or error log indicating any failures or other results of the debugging process.

Figure 4:
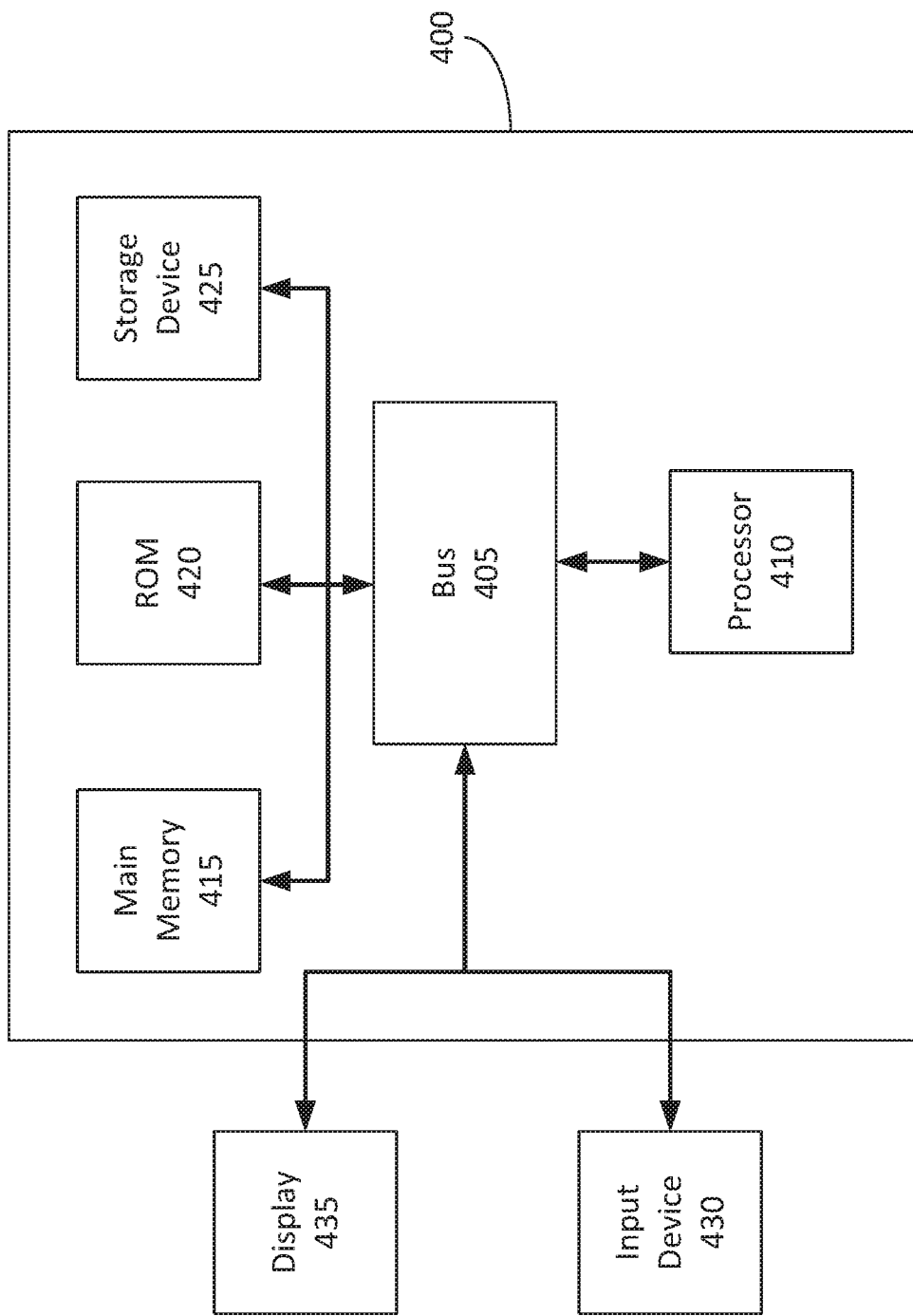
FIG. 4 is a block diagram illustrating a general architecture for a computer system that can be employed to implement elements of the systems and methods described and illustrated herein, including, for example, the systems depicted in FIGS. 1 and 2, and the method depicted in FIG. 3.

FIG. 4 is a block diagram of an example computer system 400. The computer system or computing device 400 can include or be used to implement the system 100, or its components such as the data processing system 102. The data processing system 102 can include an intelligent personal assistant or voice-based digital assistant. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 145.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 140 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the direct action API 108 or NLP component 106 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device 140 or the application developer device 160 or the third-party device 162).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 106 or the direct action API 108, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to debug applications for delivery via an application delivery server, comprising:
   a data processing system comprising one or more processors and memory to:
   identify, for an application submitted by an application developer, a messaging object configured with an action by the application developer;
   determine a first classification score based on historical execution of the action of the messaging object provided by the application developer;
   generate a machine generated action for the application based on metadata associated with the application;
   determine a second classification score based on the action of the messaging object provided by the application developer and the machine generated action;
   select, via a matching program, a second application that matches the application;
   determine a third classification score based on an action approved for the second application and the action of the messaging object provided by the application developer;
   update a delivery control parameter based on the first classification score, the second classification score and the third classification score, wherein the delivery control parameter comprises an indicator to cause the application delivery server to control delivery of the application; and
   control, responsive to the delivery control parameter updated by the data processing system, delivery of the application by the application delivery server.

2. The system of claim 1, comprising the data processing system to:
   receive the application from an application developer device; and
   receive a data file associated with the application comprising a plurality of actions established by the application developer for the application.

3. The system of claim 1, comprising the data processing system to:
   receive an indication that the application is a new application uploaded by the application developer for delivery by the application delivery server; and
   trigger, responsive to the indication of the new application, a debugging process comprising determination of the first classification score, the second classification score and the third classification score.

4. The system of claim 1, comprising the data processing system to:
   receive an indication that the application is an updated version of the application uploaded by the application developer for delivery by the application delivery server; and
   trigger, responsive to the indication of the updated version of the application, a debugging process comprising determination of the first classification score, the second classification score and the third classification score.

5. The system of claim 1, comprising the data processing system to:
   receive an indication of negative feedback for the application from a client computing device on which the application is installed; and
   trigger, responsive to the indication of the negative feedback for the application, a debugging process comprising determination of the first classification score, the second classification score and the third classification score.

6. The system of claim 1, comprising:
   the data processing system to determine to trigger a debugging process comprising determination of the first classification score, the second classification score and the third classification score prior to delivery of the application for installation on a client computing device.

7. The system of claim 1, wherein:
   the first classification score indicates whether an action corresponding to the application is satisfied based on a comparison of the first classification score with a threshold.

8. The system of claim 1, comprising:
   the data processing system to determine that the application matches the second application based on a similarity score between the application and the second application greater than a similarity threshold.

9. The system of claim 1, comprising the data processing system to:
   determine to authorize delivery of the application based on the first classification score, the second classification score and the third classification score; and
   update the delivery control parameter to cause delivery of the application by the application delivery server.

10. The system of claim 1, comprising the data processing system to:
    determine a classification failure based on the first classification score, the second classification score and the third classification score;
    update, responsive to the classification failure, the delivery control parameter to block delivery of the application by the application delivery server; and
    transmit a notification to the application developer of the classification failure.

11. The system of claim 1, comprising the data processing system to:
    determine a classification failure based on the first classification score, the second classification score and the third classification score; and
    request, responsive to the classification failure, an updated version of the application from the application developer.

12. The system of claim 1, comprising the data processing system to:
    determine, for the action of the messaging object, a classification failure based on the first classification score, the second classification score and the third classification score;
    disable, responsive to the classification failure, the action of the messaging object for execution via the application; and authorize the application for delivery by the application delivery server.

13. The system of claim 1, comprising the data processing system to:
identify a plurality of actions established for the application;
determine, via a debugging process for each of the plurality of actions, a first classification score, a second classification score and a third classification score; and
update the delivery control parameter to disable one or more of the plurality of actions based on the debugging process.

14. The system of claim 1, comprising the data processing system to:
identify a plurality of digital surfaces for execution of the action of the messaging object of the application; and
update the delivery control parameter to disable execution of the action of the messaging object of the application on a digital surface of the plurality of digital surfaces.

15. The system of claim 1, comprising the data processing system to:
trigger a debugging process for a third application;
determine, via the debugging process for the third application, a first classification score for the third application;
detect a first classification failure based on a comparison of the first classification score for the third application with a first classification threshold;
exit, responsive to detection of the first classification failure, the debugging process for the third application prior to determining a second classification score for the third application or a third classification score for the third application; and
transmit a notification of the first classification failure to an administrator device.

16. A method of debugging applications for delivery via an application delivery server, comprising:
identifying, by a data processing system comprising one or more processors and memory, for an application submitted by an application developer, a messaging object configured with an action by the application developer;
determining, by the data processing system, a first classification score based on historical execution of the action of the messaging object provided by the application developer;
generating, by the data processing system, a machine generated action for the application based on metadata associated with the application;
determining, by the data processing system, a second classification score based on the action of the messaging object provided by the application developer and the machine generated action;
selecting, by the data processing system via matching program, a second application that matches the application;
determining, by the data processing system, a third classification score based on an action approved for the second application and the action of the messaging object provided by the application developer;
updating, by the data processing system, a delivery control parameter based on at least one of the first classification score, the second classification score and the third classification score, wherein the delivery control parameter comprises an indicator to cause the application delivery server to control delivery of the application; and
controlling, by the data processing system responsive to the delivery control parameter updated by the data processing system, delivery of the application by the application delivery server.

17. The system of claim 1, wherein the indicator included in the delivery control parameter is an instruction, a numeric parameter, an alphanumeric value, a flag, or a tag.

18. The method of claim 16, comprising:
receiving, by the data processing system, the application from an application developer device; and
receiving, by the data processing system, a data file associated with the application comprising a plurality of actions established by the application developer for the application.

19. The method of claim 16, comprising:
determining to authorize delivery of the application based on the first classification score, the second classification score and the third classification score; and
updating the delivery control parameter to cause delivery of the application by the application delivery server.

* * * * *